United States Patent
Fouque et al.

(10) Patent No.: US 7,050,830 B2
(45) Date of Patent: May 23, 2006

(54) SYSTEM WITH IC CARD DEACTIVATION

(75) Inventors: Claude Fouque, Plestan (FR); Gabriel Matei, Rennes (FR); Claude Rambault, Saint Sulpice la Forêt (FR); Jean-Pierre Bertin, Guemene-Penfao (FR)

(73) Assignee: Thomson Licensing, Boulogne-Billancourt (FR)

( * ) Notice: Subject to any disclaimer, the term of this patent is extended or adjusted under 35 U.S.C. 154(b) by 514 days.

(21) Appl. No.: 10/119,606

(22) Filed: Apr. 10, 2002

(65) Prior Publication Data

US 2002/0151330 A1    Oct. 17, 2002

(30) Foreign Application Priority Data

Apr. 17, 2001 (EP) .................. 01400986

(51) Int. Cl.
*H04M 1/00* (2006.01)
*G06K 5/00* (2006.01)
*G06K 7/00* (2006.01)
*G06K 19/06* (2006.01)

(52) U.S. Cl. ............. 455/558; 235/380; 235/486; 235/492

(58) Field of Classification Search ......... 455/558, 455/557, 572, 556.1, 12.1, 552, 427; 235/492, 235/380, 486; 345/716; 307/116; 326/40; 725/38, 9, 31; 380/228, 221, 87; 713/185, 713/200

See application file for complete search history.

(56) References Cited

U.S. PATENT DOCUMENTS 5,406,064 A * 4/1995 Takahashi ............ 235/492
5,604,917 A * 2/1997 Saito et al. ............ 710/49
5,712,472 A * 1/1998 Lee ............ 235/486
5,835,156 A * 11/1998 Blonstein et al. ............ 725/38
5,847,372 A * 12/1998 Kreft ............ 235/492
5,889,272 A   3/1999 Lafon et al. ............ 235/380
5,889,941 A * 3/1999 Tushie et al. ............ 713/200
5,942,738 A * 8/1999 Cesaire et al. ............ 235/380
5,960,440 A * 9/1999 Brenner et al. ............ 707/104.1
6,016,348 A * 1/2000 Blatter et al. ............ 380/228
6,055,314 A * 4/2000 Spies et al. ............ 380/228
6,169,417 B1 * 1/2001 Pedersen ............ 326/40

(Continued)

FOREIGN PATENT DOCUMENTS

EP    0814427 A    12/1997

(Continued)

*Primary Examiner*—William Trost
*Assistant Examiner*—Kiet Doan
(74) *Attorney, Agent, or Firm*—Joseph J. Laks; Robert D. Shedd

(57) ABSTRACT

The device, and a respective system, comprises a microcontroller for signal processing and an interface controller for communicating with an IC card, the interface controller being coupled between the microcontroller and the IC card. According to the invention, the device comprises a reset button for resetting the microcontroller in case of a malfunction, the reset button being accessible to a customer, and a reset signal from the reset button simulates an IC card extraction or a card supply voltage shut down. In a special embodiment, the reset signal from the reset button is applied to the microcontroller and to the interface controller, and the signal from the reset button resetting the microcontroller is delayed by a delay circuit with respect to the signal, which resets the interface controller. The signal from the reset button is advantageously combined with the signal from a card presence contact via a logical OR-combination, and then coupled to a card presence input of the interface controller.

6 Claims, 1 Drawing Sheet

U.S. PATENT DOCUMENTS

| | | |
|---|---|---|
| 6,283,367 B1 * | 9/2001 | Matthew et al. ............. 235/380 |
| 6,411,712 B1 * | 6/2002 | Yoshida et al. ............... 380/37 |
| 6,549,774 B1 * | 4/2003 | Titlebaum et al. .......... 455/427 |
| 6,594,361 B1 * | 7/2003 | Chaney et al. .............. 380/221 |
| 6,629,223 B1 * | 9/2003 | Bachot et al. ............... 711/167 |
| 6,651,250 B1 * | 11/2003 | Takai ........................... 725/31 |
| 6,669,096 B1 * | 12/2003 | Saphar et al. ............... 235/492 |
| 6,810,479 B1 * | 10/2004 | Barlow et al. .............. 713/185 |
| 2001/0024066 A1 * | 9/2001 | Fu et al. ...................... 307/116 |
| 2002/0054068 A1 * | 5/2002 | Ellis et al. ................... 345/716 |
| 2002/0056087 A1 * | 5/2002 | Berezowski et al. ........... 725/9 |

FOREIGN PATENT DOCUMENTS

| | | | |
|---|---|---|---|
| JP | 402090252 | * | 3/1990 |
| WO | WO97/25685 | | 7/1997 |
| WO | WO 01/006443 | * | 1/2001 |

* cited by examiner

SYSTEM WITH IC CARD DEACTIVATION

BACKGROUND

The present invention relates to a system comprising a micro-controller, an interface controller and an IC card as a portable data medium, and a respective device communicating with the portable data medium. Systems of this kind are used for example for Pay TV, electronic payment, or banking services.

For these applications compact portable data media are used, having the size of about a credit card, and which comprise an integrated card-controller, or at least an integrated memory, for data exchange with a respective device. Data media of this kind are known for example as smart card, IC card or identification card, and described for example in EP-A-0 633 544. As a general term for these data media, the expression "IC card" will be used in this description.

Systems as described above are known for example from WO 98/00772 and WO 97/25685. A standard with a specification for a special type of IC cards is defined in ISO/IEC 7816-3:1997(E). In this standard the design and the operation procedures for integrated circuit cards with contacts (identification cards) are described.

As an interface controller for providing the data exchange between the microcontroller of a respective device and an IC card, integrated circuits are known, for example TDA 8004T from Philips Semiconductors, which are coupled between the microcontroller and the IC card. The interface controller provides also the voltage supply and the control functions with automatic activation and deactivation sequences for the IC card.

The object of the invention is to provide a system with an IC card as described above, which gives a user an improved safety of operation.

SUMMARY OF THE INVENTION

The invention relates to the problem that during the operation of a device with an IC card, the microcontroller of this device may run into an indefinite operating state, in which the device is no more working properly. According to the invention, the device comprises therefore a reset button for resetting the microcontroller, which is accessible to the customer, and a signal from the reset button simulates an extraction of the IC card, which provides a reset of the system. As an alternative, it may simulate an IC card supply voltage shut-down. The simulation of the IC card extraction is realised for example using a logical OR-combination, which inputs are coupled to the reset button and to a card presence contact, and which output is coupled to a card presence input of the interface controller.

In a further aspect of the invention, a delay is provided for the pulse resetting the microcontroller, for delaying this pulse with respect to the pulse resetting the interface controller. This aspect relates especially to a system, in which the clock of the interface controller is coupled to and depending on the clock of the microcontroller. When in this system the microcontroller is reset, the clock signal stops and therefore also the interface controller. Then a controlled shut-down of the IC card is no more possible. When the reset pulse for the microcontroller is delayed with respect to the pulse resetting the interface-controller, the interface controller provides the respective deactivation sequences for the IC card, before the clock signal from the microcontroller stops.

Usually the IC cards are contacted by use of metal contacts, but wireless applications are also within the invention.

BRIEF DESCRIPTION OF THE DRAWINGS

Preferred embodiments of the invention are now explained in more detail with reference to schematic drawings, which show.

DETAILED DESCRIPTION OF PREFERRED EMBODIMENTS

Figure 1:
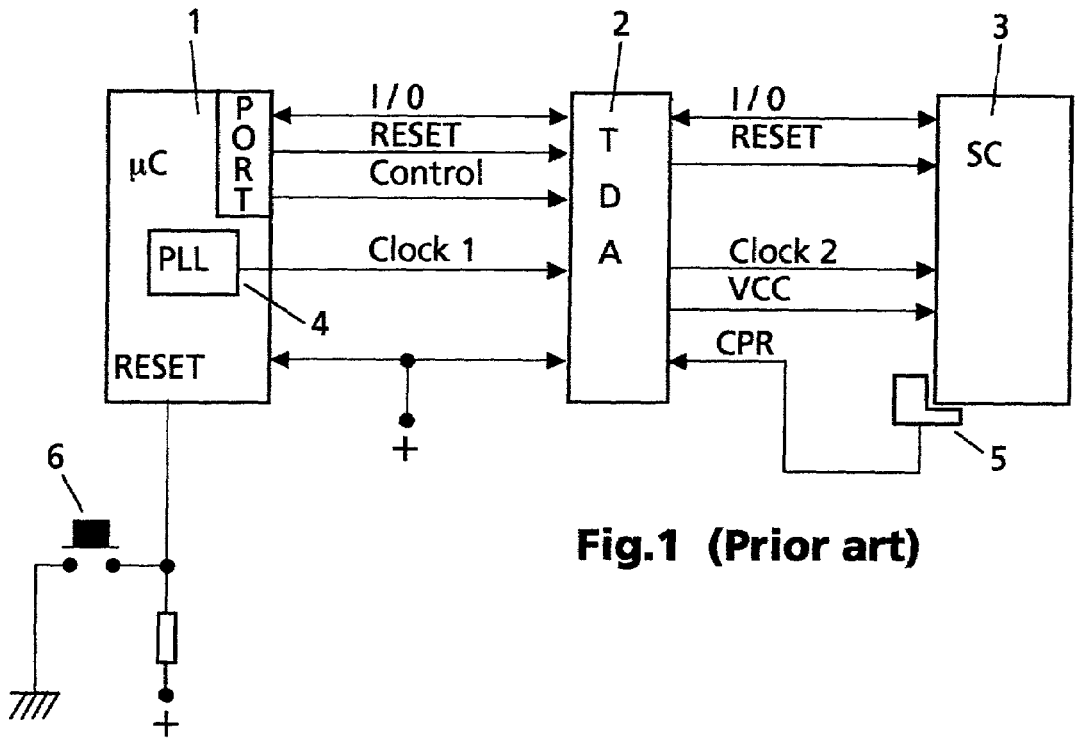
FIG. 1 a system comprising a microcontroller, an interface controller and an IC card (prior art), and FIG. 2 the system of FIG. 1, comprising in addition a reset circuit with a delay for the microcontroller.

The system as shown in FIG. 1 comprises a microcontroller 1 and an interface controller 2 for communicating with a portable data medium, especially an IC card 3, as defined in the preamble of the description. The microcontroller 1 and the interface controller 2 are arranged within a device, for example a satellite receiver or a settop box. The respective IC card 3 provides in this embodiment special television services, depending on the country, in which the device is used, and depending on the options of a user, with regard to Pay-TV. With the IC card 3 the user informs the microcontroller 1 about the respective authorisation.

As the interface controller 2 an integrated circuit is used, for example TDA 8004T of Philips Semiconductors, which complies with the ISO 7816-3 standard. This interface controller IC provides the data exchange and automatic activation and deactivation sequences for the IC card 3, also the necessary supply voltages as well as protection functions for the card contacts.

The interface controller 2 is controlled by the microcontroller 1 via a port, which is coupled to the interface controller 2, and which provides control and reset functions RESET, Control, as well as data input/output connections I/O. In this embodiment, the clock for the interface controller 2 is also provided by the microcontroller 1, signal CLOCK1 from a PLL circuit 4 within the microcontroller 1. The clock signal CLOCK2 from the interface controller 2 to the IC card 3 may have the same frequency as the CLOCK1 signal, or may differ in frequency.

When the IC Card 3 is inserted into the device, a card presence contact 5 is switched, which informs the interface controller 2 via a signal CPR, that an IC card 3 is inserted. Then the IC card 3 is activated by the interface controller 2 by providing a supply voltage VCC and a clock signal CLOCK2, and started with a reset via line RESET for performing data exchange via the I/O data lines. The detailed activation and operation for the IC card 3 is described in the specification of the TDA 8004T as well as in ISO/IEC 7816-3, to which is referred herewith.

During the operation of the device, the microcontroller 1 may run into an indefinite operating state, in which the device is no more working properly. A user may suspect then a serious malfunction and will be irritated, and may switch the device then off and on again. The device comprises therefore a reset button 6, accessible to the user, which is coupled to a reset input RESET of the microcontroller 1, for resetting the microcontroller 1 and returning herewith to normal operation of the device.

Figure 2:
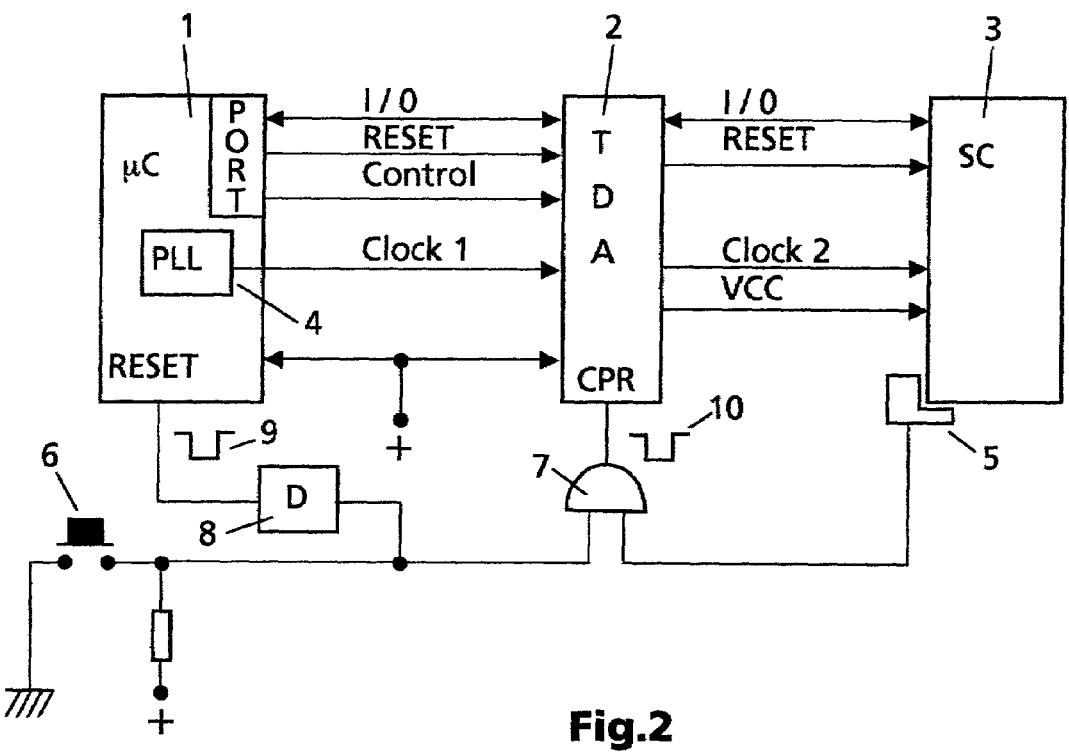

In FIG. 2 a system comprising a microcontroller 1, an interface controller 2 and an IC card 3 as described according to FIG. 1 is shown. In addition, the system comprises a reset circuit, via which the signal from the reset button 6 is applied both to the microcontroller 1 and to the interface controller 2. The reset signal from the button 6 is advantageously coupled via a logical OR-combination 7 with the line from the card presence contact 5 and then applied to the input CPR of the interface controller 2. When the button 6 is pushed by a user, the interface controller 2 assumes a removal of the IC card 3, and provides then immediately the deactivation of the IC card 3.

Between the button 6 and the reset input RESET of the microcontroller 1 a delay 8 is provided, via which the signal 9 resetting the microcontroller 1 is delayed with respect to the signal 10 resetting the interface controller 2. This is especially advantageous, when the clock for the interface controller 2, CLOCK1, is provided by the microcontroller 1. When the microcontroller 1 is reset in this case, the CLOCK1 signal stops, and therefore also the interface controller 2. With the delay circuit 8, having a delay for example of about 0.5 msec, sufficient time is provided for the interface controller 2 for deactivating the IC card 3.

In this embodiment, a reset for the microcontroller 1 as well as for the interface controller 2 is caused by a logical "0". In normal operation of the device, the signals from the reset button 6 and the card presence contact 5 are therefore "1". To provide a logical OR-combination, an AND-circuit 7 is used for combining the signals from the reset button 6 and the card presence contact 5. This results in a logical "0" for the interface controller 2, when either a logical "0" is provided by the reset button 6 or by the card presence contact 5.

The reset button 6 may be coupled also with a supply line providing the voltage VCC to the IC card 3, in which case a signal from the reset button 6 simulates a card supply voltage shut-down. The interface controller 2 may be provided also with its own circuitry for generating the clock signal, which makes the interface controller 2 independent from the signal CLOCK1. For this embodiment the delay 8 is not necessary, because then in case of a reset the interface controller 2 can deactivate the IC card 3 independent from the microcontroller 1.

The systems as described with regard to FIG. 1 and FIG. 2 comply with the specification according to ISO/IEC 7816-3, but other applications lie also within the range of the invention.

To the logical OR-combination 7 in addition also a reset signal from a watchdog circuit may be coupled. The watchdog circuit, known also as watchdog timer, is monitoring the proper operation of the microcontroller and provides a timing function in that it is waiting a certain time period for a reset signal from the microcontroller, which the microcontroller provides periodically during normal operation. In case of an software error, for example when the microprocessor is hanging in a loop, the reset signal for the watchdog circuit is no more generated, and then the watchdog circuit provides a reset for the microcontroller. As a result, the microcontroller provides a restart for returning to the normal mode of operation. The watchdog circuit may included for example within the microcontroller 1.

The reset signal from the watchdog circuit is applied advantageously to a second logical OR-combination to combine this signal with a reset signal from the reset button 6, and the output of this OR-combination is coupled both to the delay 8 input and to an input of the first logical OR-combination 7.

What is claimed is:

1. System comprising:
    a microcontroller,
    an IC card,
    an interface controller coupled between said microcontroller and said IC card for communicating with said IC card,
    a card presence contact coupled with the interface controller for providing a signal for informing the interface controller, when said IC card is inserted, and
    a reset button being accessible to a customer for resetting said microcontroller, said reset button being coupled to a reset input of said microcontroller for resetting said microcontroller, and
    a logical OR-combination having inputs to which said reset button and said card presence contact are coupled for providing an IC card extraction signal to said interface controller to cause a controlled shut-down of said IC card, when said reset button is pushed.

2. System according to claim 1, wherein a signal from said reset button resetting said microcontroller is delayed with respect to a signal, coupled to said interface controller.

3. Device comprising:
    a microcontroller for signal processing,
    an interface controller for communicating with an IC card, when an IC card is inserted into said device, said interface controller being coupled between said microcontroller and said IC card,
    a card presence contact coupled with the interface controller for providing a signal for informing the interface controller, when said IC card is inserted, and
    a reset button being accessible to a customer for resetting said microcontroller, said reset button being coupled to a reset input of said microcontroller for resetting said microcontroller, and
    a logical OR-combination having inputs to which inputs of said reset button and said card presence contact are coupled for providing an IC card extraction signal to said interface controller to cause a controlled shut-down of said IC card, when said reset button is pushed.

4. Device according to claim 3, wherein the signal from said reset button resetting said microcontroller is delayed by a delay circuit with respect to the signal, which indicates to said interface controller that an IC card is present or not.

5. Device according to claim 3, comprising further a second logical OR-combination to combine the signal from said reset button with a reset signal from a watchdog circuit being included, within said microcontroller, the output of said second OR-combination being coupled to the delay input and to an input of said first logical OR-combination.

6. Device according to claim 3, wherein the device is a settop box or a satellite receiver with an IC card operation for Pay TV or electronic payment.

* * * * *